United States Patent Office 2,943,679
Patented July 5, 1960

2,943,679

WELL-SERVICING COMPOSITIONS AND METHODS

Platho P. Scott, Jr., Tulsa, Okla., and Alfred O. Fischer, Alice, Tex., assignors to Pan American Petroleum Corporation, a corporation of Delaware No Drawing. Filed July 15, 1955, Ser. No. 522,364

12 Claims. (Cl. 166—21)

This invention relates to the use of finely divided angular hard granules of materials in well-servicing slurries introduced into wells for various purposes such as drilling, workover, cementing, and the like. It relates particularly to the use of such granular material in drilling fluids.

This application is a continuation-in-part of our U.S. patent application Serial Number 269,529, filed February 1, 1952, now abandoned. The parent application teaches the use of the hard portions of plant seeds in granular form for stopping loss of slurries such as drilling fluids to naturally-occurring fractures, crevices, fissures and vugs in formations. It also teaches the use of such materials for preventing hydraulic fracturing of the formations by the well-servicing liquid and sealing such fractures as may occur.

The parent application emphasizes the importance of using a gradation of particle sizes containing some particles in the range which will be retained on a 16 mesh screen and some in the range between about 30 and about 100 mesh. It has been demonstrated that the larger particles are essential for bridging most of the larger naturally-occuring crevices which are encountered in drilling. We have also found that the larger particles are frequently required to bridge fractures which have occurred due to hydraulic effects during drilling operations with ordinary drilling fluids. The parent application suggests maintaining the ground hard vegetable materials in the drilling fluid to prevent fracturing of the formation due to hydraulic effects. This procedure is often followed even though it means bypassing the shale shaker. This bypassing of the shale shaker is usually very undesirable since the bit cuttings are recirculated down the well where they are reground by the bit and dispersed in the drilling fluid. The result is a rapid increase in viscosity of the drilling fluid. The problem becomes particularly serious in deep drilling where heavily weighted expensive muds are used. In such cases bypassing of the shale shaker with the resulting rapid increase in viscosity requires frequent dilution of the drilling fluid with water and reweighting with expensive heavy additives. Thus, the operator finds himself in a dilemma where he must either drill without the granular materials and lose considerable drilling fluid before these materials can be circulated to the loss zone, or he must maintain the additive in the drilling fluid and bypass the shale shaker, thus requiring frequent dilution and reweighting of the drilling fluid. It is also usually dangerous to use coarse granular materials in drilling fluids during coring operations since such particles may tend to stick core barrels.

A drilling problem relatively unrelated to loss of circulation arises from the rubbing of the drill pipe against the well walls. The problem is particular serious in areas where the wells tend to be crooked. Two problems arise out of this rubbing action. In the first place, increased torque must be applied to the drill pipe to overcome the frictional drag. In the second place, the vertical frictional drag of variable and unknown magnitude causes the weight on the bit to be variable and unknown. In addition, the friction may decrease vibration of the bit which appears to increase drilling rates. A means for decreasing the frictional drag would obviously be very desirable for these reasons. Here again the material should be continuously maintained in the drilling fluid.

Another apparently unrelated drilling problem is due to so-called heaving shales, which tend to become hydrated by water or to be dispersed in it. A means for decreasing penetration by water of porous zones adjacent to the shale formations or interbedded with them is desirable to reduce the degree of contact between the shales and water. Again, to be effective, the means should function at all times, since intermittent treatment will produce only a limited amount of benefits.

In cementing operations, using Portland cement slurries for example, loss of the slurry to naturally-occurring or hydraulically produced fractures is also sometimes a problem. This is thought to be due to the high density of the cement slurry. A column of this high-density material imposes a high pressure on formations penetrated by wells being cemented. This pressure may be considerably higher than that caused by drilling fluids during drilling operations. A means for plugging fractures as soon as they are formed is highly desirable to prevent excessive loss of the cement slurries to the fractures.

With the above problems in mind, an object of the invention is to provide a granular hard material capable or bridging formation fractures when carried into the fractures in the form of suspensions in liquids. Another object is to provide an improved well-servicing slurry. A further object is to provide an improved drilling fluid for use in well-drilling operations. Still another object is to provide an improved cementing composition for use in well-cementing operations. A more specific object is to provide an improved method for servicing wells where loss of drilling fluid, cement slurries, or the like occur due to hydraulic fracturing of the formations penetrated by the well. Still another specific object is to provide an improved method for drilling wells where frictional drag of the drill pipe is a problem or where heaving or sloughing of shale into the well occurs. An additional specific object is to provide a method for cementing casing in a well where the hydrostatic head of the cement slurry is sufficient to cause hydraulic fracturing of the formations penetrated by the well.

We have now found that if the ground hard materials are present in drilling fluid at the time a fracture occurs, they act so quickly to bridge and seal the fracture that it usually does not expand sufficiently to require coarse granular material to bridge it. Consequently, it is possible to use a gradation of granular materials sufficiently small to pass through the shale shaker. These finely divided particles are too small to stick core barrels. Occasionally, a fissure will be encounterd or may be formed which is too large to be sealed by the fine material alone. Then coarsely ground hard granular material must be added. This coarse material acts with the fine particles already in the drilling fluid to form the gradation of particle sizes described and claimed in the parent application. The coarse particles are, of course, removed by the shale shaker upon circulation of the drilling fluid to the surface, but by that time the larger fissue is sealed and only the finer particles for sealing the small fractures are necessary. These, of course, pass through the shale shaker and are retained in the drilling fluid. It may be advisable to remove core barrels during the treatment of drilling fluids with large granular materials.

The same ability of finely ground hard granular materials to seal newly formed fractures can also be used in cementing. It is sometimes undesirable to add coarse bridging material to cement slurries used in cementing casing because of the danger that such coarse material will form a bridge outside the casing and cause channeling of the cement slurry through the mud. In squeeze cementing through perforations, coarse bridging material may plug the perforations and prevent an effective squeeze job. In both cases, however, it may be desirable to plug fractures as rapidly as they are formed in order to avoid excessive loss of cement slurry to such fractures. Under these circumstances, finely ground hard granular materials can be incorporated in the cement slurries. These materials will not bridge large openings, but will seal most fractures as soon as they are formed.

It will be apparent that certain limits exist on particle size range, type of materials of which the particles are made, particle shape, and concentrations desired in various applications. These factors will now be defined in more detail.

PARTICLE SIZE RANGE

Substantially all the particles should pass through a number 30 screen and be retained on a number 100 screen. These screen sizes, together with others mentioned herein, are U.S. Standard Sieve Series (1940)—Fine Series numbers. These are described, for example, in Handbook of Chemistry and Physics, published by Chemical Rubber Publishing Company, 36th edition, page 3079. Particles in this size range are normally referred to as 30 to 100 mesh particles. A number 30 screen is frequently termed a 30 mesh screen.

The limits of the rather narrow range of particle sizes are set by several critical factors. If the particles are too large, they will be removed from drilling fluids by shale shakers and may stick core barrels. If larger particles are used in cement slurries, they may cause undesirable bridging of larger openings in equipment or may bridge outside of casing, for example. If the particles are too small, they cause excessive thickening of the liquids to which they are added. Furthermore, in drilling fluids and cements, finely divided material is already present so the very finely divided hard granular materials really are not needed.

A substantial portion, at least about 20 percent, of the total additive should be of a relatively coarse nature, for example, passing through a number 30 and being retained on a number 40 screen. This will permit sealing the largest possible fissures, whether of a naturally-occurring or a hydraulically formed type.

It will be understood that the amount of 30 to 40 mesh particles in the additive can sometimes be reduced below the minimum limits set above and still form a bridge. For example, substantially the same results can be obtained by cutting in half the amount of 30 to 40 mesh material in the additive and doubling the concentration of additive in a drilling fluid. Such an expedient, however, is seldom justifiable from an economic standpoint. A bridge of sorts can sometimes be formed with reduced amounts of 30 to 40 mesh material in the additive, even when the concentration of additive in the slurry is not increased. However, the bridge and seal will form much more slowly so that a large volume of slurry may be lost to the crevice during formation of such a bridge. In addition, such bridges as do form are sometimes weak so that several may form and break before a permanent one is achieved. For these reasons, it is generally advisable to observe carefully the minimum limits on amounts of 30 to 40 mesh material set out above.

The maximum amount of 30 to 40 mesh particles in the additive will be governed by the minimum requirement for 40 to 100 mesh material. Most drilling fluids contain considerable quantities of particles which will pass a number 40 screen and be retained on a number 100 screen. Many drilling fluids, however, do not contain sufficient material in this particle size range to form an effective seal over a bridge formed of larger particles. Even those drilling fluids which contain particles in the 40 to 100 mesh range frequently do not form effective seals over a bridge of larger particles since the drilling fluid materials are usually too weak or soft. For these reasons, the drilling fluid additive should contain at least about 10 percent and preferably at least about 20 or 25 percent of particles in the 40 to 100 mesh range. Thus, the amount of 30 to 40 mesh material in the additive should not exceed 90 percent and preferably should not be more than about 75 or 80 percent.

Preferably the finer additive particles should be fairly uniformly distributed in sizes from about 30 mesh down to about 100 mesh. It is possible, however, to obtain most of the beneficial effects by using a narrower particle size range such as from 50 to 60 or from 70 to 80 mesh. The additive may contain 10 or 20 percent of particles passing through a number 80 and being retained on a number 100 screen without causing excessive thickening of the slurry. It should preferably contain no more than about 5 or at most 10 percent of particles passing through a number 100 screen to avoid excessive thickening action when higher concentrations of the additive are employed in drilling fluids, cement slurries and the like.

The preferred composition of the additive contains a gradation of particles from 30 to 100 mesh in which about 50 percent of the particles pass a number 30 screen and are retained on a number 40 screen, and about 50 percent pass a number 40 screen and are retained on a number 100 screen.

TYPE OF MATERIAL

Materials found to be most suitable for my purposes include such types as walnut shells, peach pits, coconut shells, outer capsules of Brazil nuts, pecan shells, hard rubber and hard plastics such as polystyrene, and the like. Of these materials, we prefer the hard portions of the seeds of plants. The term "plant seeds" is used broadly, in this connection, to include outer shells such as nutshells, for example. Most plant seeds have some portions which are relatively harder than others; in some cases, even the harder portions are not hard enough. Some plastics are also too soft or too elastic. We have now found that satisfactory materials for use in bridging small fractures should have the following properties:

(1) The material should be insoluble in oil and water and should not soften seriously in either of these liquids. The terms "water-resistant" and "oil-resistant" will be employed hereinafter to mean that the material is both insoluble and does not soften seriously when exposed to these liquids for a period of at least about 30 days. These properties are necessary since the materials will normally be used in the presence of one or both of these liquids. The term "oil" is intended to mean crude petroleum oil or a fraction thereof.

(2) The material should have a melting point of at least about 120° F. if it is to be operable in even shallow wells. Preferably the melting point should be about 300° F. to permit use in deep high-temperature wells.

(3) The specific gravity of the material compared to water should lie between about 0.8 and 2.0 to avoid excessive tendency of the material to float or sink. Preferably, the specific gravity should lie between about 1.0 and 1.5.

(4) The material should be strong to resist a tendency to break under the differential pressure which will be built up across the bridge of particles in or across fractures. We have found that the material should have a compressive strength of at least about 5,000 pounds per square inch if it is to be satisfactory for general use as a bridging agent.

(5) In addition to being strong, that is, resisting rupture under load, the material must also have a high modulus of elasticity. That is, it should resist deformation. For example, soft rubber meets most requirements including that of strength, but it deforms so readily that it flows into fractures rather than bridging them. To avoid an undesirable degree of deformation, the material should have a modulus of elasticity of at least about 10,000 pounds per square inch.

(6) The material must not be too abrasive. It is well known, for example, that sand in drilling fluid exerts a serious abrasive action on steel drill pipe. A convenient measure of the abrasive nature of materials is Mohs' scale used by mineralogists. On this scale, common steel has a hardness of about 5. Therefore, the bridging material should have a hardness less than about 5 to avoid abrasion of steel equipment. On the other hand, the material should not be too soft or brittle or it will itself suffer abrasion and breaking while the slurry is passing through pumps and is flowing in the well. A lower limit of about 2 on Mohs' scale of hardness should be observed to avoid excessive abrasion of the particles of bridging material. This is especially true of drilling fluids which may be circulated down a well and back to the surface many times during drilling operations.

It will be understood that mixtures of materials meeting the above requirements may be used. For example, when reference is made hereinafter to a single material such as the hard portion of a plant seed, the term is intended to indicate either seeds of a single species of plant or mixtures of seeds from several types of plant.

PARTICLE SHAPE

Two factors of particle shape are important. First, the particles should be granular as distinguished from fibrous or lamellated. That is, they should have approximately the same dimensions in all directions. If the particles are long or flat, they tend to be much weaker than granular particles with the same maximum dimensions. Therefore, fibrous or lamellated bridging agents, falling within a given size range, as determined by sieve analysis, form a much weaker and less effective bridge than granular materials in the same range of sizes. A convenient measure of the granular nature of a particle is illustrated in Stratigraphy and Sedimentation by W. C. Krumbein and L. L. Sloss, published by W. H. Freeman and Co., 1951 edition. Page 81 of this reference presents a comparison chart by which the average sphericity factor of particles can be determined. The same chart also permits determination, by comparison, of the second important factor. This is the angularity of the particles. If a particle has many sharp angles and points, it interlocks with other similar particles more readily to form an effective bridge than if the edges and corners are rounded and smooth. Krumbein and Sloss define this property by a roundness factor. Comparison of particles known to produce effective bridges to those known to produce less effective ones indicates that the particles should have an average sphericity factor of at least about 0.4 and an average roundness factor of not more than about 0.6. For convenience, these factors will be referred to hereinafter as Krumbein sphericity and Krumbein roundness, respectively.

CONCENTRATIONS

The recommended concentration of bridging agent in the slurry depends in part on the particular type of well operation in which the slurry is to be used and in part on the particular type of material employed. As little as one-half pound of the preferred material, ground black walnut shells, has been found to produce some effects in drilling fluids. Normally at least about 2 pounds of nutshells per barrel of drilling fluid should be used. For the softer, weaker, and less angular materials falling within the limits outlined above, 2 pounds per barrel should be regarded as a minimum limit. An upper concentration limit of about 25 or 30 pounds per barrel is usually observed for drilling fluids. This is principally for economic reasons. From a technical standpoint, use of even higher concentrations, for example up to about 60 pounds per barrel, is not objectionable and usually produces at least slightly stronger bridges in a slightly shorter time than when concentrations below about 30 pounds per barrel are employed. The ultimate limit is reached when sufficient finely divided additive is used to thicken the drilling fluid to such a degree that it becomes unpumpable.

In cement slurries, the same general concentration ranges apply as in drilling fluids. In practice, however, it is customary to employ high concentrations of around 20 to 30 pounds or even more ground walnut shells per barrel of cement slurry. For example, as much as 60 pounds per barrel are sometimes used. The increased cost of higher concentrations is small and the importance of sealing fractures as soon as formed is very great. A concentration sufficient to provide a large safety factor over the minimum concentration thought to be effective is generally considered advisable under these circumstances.

METHODS OF APPLICATION

The slurry of finely divided bridging additive in the supporting liquid can be prepared in a number of ways. In one method, the finely divided additive may be premixed with other dry materials such as clay or weighting agents for drilling fluid, or dry cement for cementing slurries. The dry mixture of powders can then be added to the liquid as it is pumped into the well. Preferably, proportioning means should be employed to insure that the concentrations of dry solids in the slurry are in the desired ranges. It is also possible to premix all the ingredients except the finely divided additive and add this material last, just before the liquid enters the well. A large batch of slurry containing the bridging agent may be mixed in a suitable container such as a tank or mud pit on the surface. This slurry may then be pumped into the well.

In drilling and casing cementing practices, the slurry is circulated down the well through a pipe and then up the well around the outside of the pipe. In cementing operations, the cement slurry may or may not be circulated to the surface outside the pipe. In drilling operations, on the other hand, the slurry is generally circulated to the surface and back down the pipe after suitable treatment such as removal of bit cuttings, gas, and the like. In drilling and cementing operations, the finely divided bridging material should be maintained at a suitable concentration in the slurry at all times to bridge and seal fractures as soon as they are formed.

Our invention will be better understood by considering the following examples:

Example 1

To determine the crevice-sealing abilities of various materials, a slit about 1 inch long and 0.02 inch wide was formed in a thin sheet of steel. This sheet was then sealed across a 1¼ inch pipe by use of a modified union and O-rings. Drilling fluid containing various concentrations of bridging agents was pumped through the pipe and slit to determine which agents would bridge the slit and at what concentrations. The drilling fluids normally had a viscosity of about 40 to 50 centipoises, as determined by a Stormer viscosimeter rotating at about 600 r.p.m., and a fluid loss of about 15 to 20 cc. as determined by the standard test described in API Code No. 29, second edition, July 1942 (Tentative). Some tests were run through slits having widths larger than 0.02 inch. In each test the amount of mud was determined which flowed through the slit before a seal was formed. In addition, the pressure which such a seal would withstand before breaking was measured so long as that pressure was below 1,000 p.s.i. No measurements were made above 1,000 p.s.i. because such a differential across a bridge in a fracture usually does not occur during drilling or cementing operations. For the sake of simplicity, the properties of materials tested and the results of tests are reported separately. The properties of the bridging agents are reported in Table I, as follows:

TABLE I

| Material | Compressive Modulus of Elasticity | Compressive Strength | Melting Pt., °F. | Hardness Mohs' Scale | Specific Gravity |
|---|---|---|---|---|---|
| Walnut shells | 170,000 | 20,000+ | 300+ | 3 | 1.3–1.4 |
| Polystyrene | 260,000 | 12,500 | 200 | 3 | 1.1 |
| Soft rubber | 2,500 | 5,000+ | 300+ | 1 | 1.1 |
| Hard rubber | 40,000 | 5,700 | 300+ | 2 | 1.3 |
| Mica | | 25,000 | 300+ | 3 | 2.8 |
| Sand (quartz) | 3,000,000+ | 40,000 | 300+ | 7 | 2.2 |

In Table I, the modulus of elasticity and strength are both in pounds per square inch. Mohs' scale of hardness is an arbitrary scale further defined in Kent's Mechanical Engineers' Handbook, twelfth edition (1950), vol. 2, pages 1–27. The specific gravity is compared to water. The materials listed in Table I were ground and/or screened to obtain a gradation of particle sizes passing a 30 mesh screen and retained on a 100 mesh screen. The slit-sealing abilities of these particles are shown in Table II.

TABLE II

| Slit Size, in. | Material | Krumbein Roundness | Krumbein Sphericity | Conc., lbs./bbl. | Pressure Held, p.s.i. | Mud Loss before Seal, c.c. |
|---|---|---|---|---|---|---|
| .02 | Walnut shells. | 0.3 | 0.7 | 2 | 1000 | 10 |
| .02 | ---do--- | 0.3 | 0.7 | 5 | 1000 | 15 |
| .02 | ---do--- | 0.3 | 0.7 | 10 | 1000 | 6 |
| .02 | ---do--- | 0.3 | 0.7 | 15 | 1000 | 9 |
| .02 | ---do--- | 0.3 | 0.7 | 25 | 1000 | 14 |
| .03 | ---do--- | 0.3 | 0.7 | 10 | 1000 | 50 |
| .02 | Polystyrene. | 0.5 | 0.6 | 2 | 1000 | |
| .02 | Soft Rubber. | 0.9 | 0.5 | 20 | <100 | 200 |
| .02 | Hard Rubber. | 0.2 | 0.5 | 5 | 800 | 50 |
| .02 | ---do--- | 0.2 | 0.5 | 10 | 800 | 30 |
| .02 | ---do--- | 0.2 | 0.5 | 20 | 1000 | 40 |
| .02 | ---do--- | 0.2 | 0.5 | 25 | 1000 | 15 |
| .03 | ---do--- | 0.2 | 0.5 | 25 | 1000 | 40 |
| .02 | Mica. | 0.2 | 0.1 | 5 | 20 | 200 |
| .02 | ---do--- | 0.2 | 0.1 | 10 | 200 | 200 |
| .02 | ---do--- | 0.2 | 0.1 | 20 | 500 | 200 |
| .02 | Sand. | 0.8 | 0.9 | 2 | 150 | 100 |
| .02 | ---do--- | 0.8 | 0.9 | 10 | 1000 | 55 |
| .02 | ---do--- | 0.8 | 0.9 | 15 | 1000 | 30 |
| .02 | ---do--- | 0.8 | 0.9 | 25 | 1000 | 36 |
| .03 | ---do--- | 0.8 | 0.9 | 20 | 0 | 200 |

The data in Table I show that, of the materials tested, walnut shells, polystyrene and hard rubber should be satisfactory bridging agents. These materials are also water-resistant and oil-resistant. The results in Table II indicate that these three materials were in fact satisfactory. Polystyrene would not, of course, be suitable for use in high-temperature wells due to its low melting point. However, it should be completely satisfactory in shallow wells.

Soft rubber fills all requirements except that its modulus of elasticity is too low. It is much too resilient and elastic. The failure to form a seal in the slit test results from the resilient particles deforming under pressure and squeezing through the slit. The unsatisfactory nature of soft rubber for stopping loss of circulation has been confirmed in the field.

Mica appears to be perfectly satisfactory from the data in Table I, with the exception of the high specific gravity. Thus, it might be expected that mica would be operable to seal a slit in the laboratory test, but would settle badly in field operations. Actually, it did not form an effective seal in the laboratory test and little if any settling has been observed in field use. The answer to both apparent anomalies is the lamellate nature of the particles. In Table II, it will be noted that the average Krumbein spherically of mica probably is only about 0.1. These thin platelets are easily supported in drilling fluids in spite of their high specific gravity. They are so weak, however, that a small amount of differential pressure across a bridge of the platelets causes them to break so the bridge and fracture seal are lost. This same weakness, together with a tendency to split along natural cleavage planes, is responsible for a rather rapid disintegration observed in field use of mica in drilling fluids.

The sand, like the mica, has a high specific gravity. In the case of the sand, the particles are nearly spherical, so they tend to settle rapidly, particularly in thin muds, and may cause sticking of the drill pipe in the well and failure of core barrels to operate. They may also bridge outside the casing in casing cementing operations. In addition, it will be noted that sand is considerably harder than most steel. For this reason, sand-filled drilling fluid or cement slurries can cause a serious abrasion problem. Because of the high density and abrasive nature of sand, most operators make every reasonable effort to keep sand out of drilling fluids and cement slurries. Ordinary sand has been rolled over and over in the trip from its point of origin to the point where it is found. Therefore, the particles generally have a very high Krumbein roundness. The sand tested, for example, had an average Krumbein roundness of 0.9. Due to this lack of angularity, 20 pounds of sand per barrel of drilling fluid would not seal a 0.03 inch slit. On the other hand, only 10 pounds of the relatively angular walnut shells per barrel of the same drilling fluid sealed the 0.03 inch slit easily. In a sieve analysis of the walnut shells, about 50 percent passed a number of 30 screen and was retained on a number 40 screen. The other 50 percent passed the number 40 screen, but was retained on a number 100 screen.

*Example II*

To determine the effects of the smaller particles in the bridging agents, the following test was made. The apparatus consisted of a standard API filter press. No filter paper was employed. Instead a 1-inch mat of walnut shells was poured directly onto the bottom screen. About 300 cc. of the drilling fluid described in Example I was then poured into the test chamber and a filtrate determination made at 100 p.s.i. as in the usual API test. The test was repeated using various ranges of particle sizes. The results are reported in Table III.

TABLE III

| Walnut Shell Mesh Size | | Mud Through at 100 p.s.i. |
|---|---|---|
| Through | Retained On | |
| 30 | 40 | All mud through in 20 seconds. |
| 40 | 60 | All mud through in 25 seconds. |
| 40 | 80 | All mud through in 100 seconds. |
| 40 | 100 | 30 cc. mud through and then filter cake formed so that only filtrate passed. |

As previously pointed out, in many cases, probably in most cases, drilling fluids contain sufficient finely divided particles in the range finer than about 40 mesh to complete a seal once a bridge of coarser particles is formed. From the results reported in Table III, however, it will be apparent that some drilling fluids do not contain sufficient finely divided particles to complete a seal unless the bridging agent itself contains particles as small as 100 mesh. A bridging composition for general use should, therefore, include some finely divided particles down in the range of 80 to 100 mesh.

*Example III*

Another determination of the effects of finely divided particles was made by adding walnut shells ground to various degrees of fineness to drilling fluid, such as that described in Example I, and determining the viscosity of the resulting slurry. The viscosities were measured in a Stormer viscosimeter rotating at approximately 600 r.p.m.

In all cases, the concentration of walnut shells was 20 pounds per barrel of drilling fluid. The results are presented in Table IV.

TABLE IV

| Walnut Shell Mesh Size | | Viscosity, cpse. |
|---|---|---|
| Through | Retained On | |
| (1) | (1) | 34 |
| 20 | 30 | 35 |
| 30 | 100 | 39 |
| 30 | 200 | 47 |
| 30 | 350 | 70 |

1 No nutshells.

From the above results it will be apparent that as little of the very fine particles should be used as possible. Since 100 mesh particles seem to perform all the functions required of the bridging agent, use of particles finer than 100 mesh should be avoided.

*Example IV*

To determine the effects of particle size on torque-reducing properties of the bridging agents, the following test was made.

A solid steel cylinder about 1 3/16 inches in diameter and weighing about 0.56 pound was mounted with its axis vertical. It was rotated around its axis at a constant speed of about 300 r.p.m. The cylinder was free to move vertically, and was supported by the face of a disc of sandstone at a point displaced from the center of the disc. The radius of curvature of the bottom edge of the cylinder was about 1/4 inch. The disc was tilted so it was in contact with only one edge of the bottom of the steel cylinder. The sandstone disc was free to turn about its center except for the action of a restraining spring. In operation, drilling fluid as described in Example I was introduced into a container surrounding the steel cylinder and sandstone disc so the mud lubricated the sliding of the rounded edge of the cylinder on the sandstone. Various friction-reducing agents were added to the drilling fluid and their lubricating ability was determined by measuring the angular displacement of the sandstone disc against the action of the restraining spring as the edge of the rotating steel cylinder dragged against the disc and tended to rotate it. The results of tests of various friction reducing agents are shown in Table V.

TABLE V

| Material and Concentration | Percent Friction Reduced |
|---|---|
| 4 lb./bbl. graphite | 1 |
| 4 lb./bbl. molybdenum disulfide | 1 |
| 15% diesel oil | 6 |
| 4 lb./bbl. graphite + 10% diesel oil | 17 |
| 2 lb./bbl. Bakelite (150 mesh) | 40 |
| 2 lb./bbl. Lucite (150 mesh) | 40 |
| 2 lb./bbl. Nylon (150 mesh) | 42 |
| 2 lb./bbl. Polystyrene (30 mesh) | 42 |
| 2 lb./bbl. Polyethylene (30 mesh) | 42 |
| 2 lb./bbl. walnut shells (200 to 325 mesh) | 8 |
| 2 lb./bbl. walnut shells (140 to 200 mesh) | 25 |
| 2 lb./bbl. walnut shells (100 to 140 mesh) | 40 |
| 2 lb./bbl. walnut shells (80 to 100 mesh) | 55 |
| 2 lb./bbl. walnut shells (40 to 80 mesh) | 66 |
| 2 lb./bbl. walnut shells (20 to 40 mesh) | 66 |
| 2 lb./bbl. walnut shells (10 to 20 mesh) | 66 |
| 2 lb./bbl. walnut shells (4 to 10 mesh) | 75 |

Both graphite and diesel oil have been used in drilling fluids to decrease friction and improve drilling rate. The superiority of strong granular materials as lubricants for well drilling operations is apparent from the above results.

*Example V*

To determine the effects of the addition of finely divided bridging agents on well drilling operations, nutshell fines (30 to 100 mesh) were added to the drilling fluid in a well drilling at 6,000 feet in Hansford County, Texas. The rotary table was rotating at 102 r.p.m. At constant engine throttle, and holding all other factors as constant as possible, about 2 1/2 to 3 pounds of nutshell fines were added per barrel of drilling fluid and the rotary table speed noted. The speed slowly increased from 102 r.p.m. to 109 r.p.m. as the content of nutshell fines slowly increased. This indicates a considerable reduction in friction of the drilling equipment in the hole. A concentration of about 3 pounds of nutshell fines was montained in the drilling fluid while drilling below 6,000 feet. At about 6,800 feet, a zone was drilled in which loss of circulation is generally a serious problem. There was no evidence of loss of the drilling fluid containing nutshell fines to this zone, indicating any fractures were sealed rapidly. In addition, the usual trouble in cementing casing through this zone was avoided. This was apparently due to the nutshell bridges established in the fractures during drilling operations.

*Example VI*

A well in the Sherman Field, Greyson County, Texas, was drilling at 9,241 feet through the Cordell sand. The formation is hard and the bit was becoming dull. Consequently, drilling rate had decreased to 1.6 feet per hour. After the addition of 2 pounds of 30 to 100 mesh walnut shells per barrel of drilling fluids, the drilling rate gradually increased to 3.3 feet per hour average at 9,248 feet. At this point, the drilling string was pulled and the bit was examined. As suspected, the bit was quite dull. During the addition of nutshells, the rotary speed, weight on bit, and pump pressure were held as constant as possible. Two facts should be noted in this test. First, nutshell fines in drilling fluid increased drilling rate. Second, with nutshell fines in the drilling fluid, even dull bits drill at acceptable rates, thus increasing the number of feet which can be drilled per bit.

*Example VII*

Mud was being lost at a rate of 5 to 10 barrels per hour to a loss zone in a well in the Rayne Field, Arcadia Parish, Louisiana. The mud weighed between 15.0 and 15.1 pounds per gallon. It contained about 6 pounds of mica per barrel of drilling fluid. The addition of 20 sacks of 30 to 100 mesh walnut shells (50 pounds per sack) over an 8-hour period stopped the loss. By adding about 5 sacks every 8 hours to maintain the concentration at about 3 pounds per barrel, further loss of circulation was avoided. This field test substantitiates the laboratory data which show that granular material is much more effective than lamellated materials such as mica as a lost circulation remedy. The test also indicates that 30 to 100 mesh granular materials will bridge a fracture which has existed for some time if the fracture is not too large.

Consideration of the above description and examples will demonstrate that we have accomplished the objects of our invention. A material has been provided which is capable of bridging in formation fractures when carried into the fractures in the form of a suspension in a liquid. The material can be maintained in drilling fluids at all times since it passes the shale shaker. It does not contain large particles which tend to bridge in equipment such as core barrels or cementing ports. It has been shown to decrease friction and increase drilling rates. It does not adversely affect the properties of slurries introduced into wells.

We claim:

1. A well-servicing composition comprising a slurry and from about 2 to 60 pounds of an additive per barrel of said slurry, said slurry being of the class consisting of aqueous drilling fluids, non-aqueous drilling fluids and Portland cement slurries, and said additive consisting essentially of granular particles of a water-resistant, oil-resistant material having a compressive strength of at least about 5,000 pounds per square inch, a modulus of elasticity of at least about 10,000 pounds per square inch, a hardness between about 2 and 5 on the Mohs scale, a specific gravity between about 0.8 and 2.0 compared to water, and a melting point of at least about 120° F., said particles having an average Krumbein sphericity of at least about 0.4 and said additive consisting of from about 20 to 90 percent particles passing a number 30 screen and retainable on a number 40 screen, from about 10 to 80 percent particles passing a number 40 screen and retainable on a number 100 screen, and not more than about 10 percent particles passing a number 100 screen, all percentages being by weight.

2. A well-servicing composition comprising a slurry, and from about 2 to 60 pounds of an additive per barrel of said slurry, said slurry being of the class consisting of aqueous drilling fluids, non-aqueous drilling fluids and Portland cement slurries, and, said additive consisting essentially of granular particles of a water-resistant, oil-resistant material having a compressive strength of at least about 5,000 pounds per square inch, a modulus of elasticity of at least about 10,000 pounds per square inch, a hardness between about 2 and 5 on the Mohs scale, a specific gravity between about 0.8 and 2.0 compared to water, and a melting point of at least about 120° F., said particles having an average Krumbein sphericity of at least about 0.4 and an average Krumbein roundness of not more than about 0.6, and said additive consisting of from about 20 to 90 percent particles passing a number 30 screen and retainable on a number 40 screen, from about 10 to 80 percent particles passing a number 40 screen and retainable on a number 100 screen, and not more than about 10 percent particles passing a number 100 screen, all percentages being by weight.

3. The well-servicing composition of claim 2 in which said slurry is a drilling fluid.

4. The well-servicing composition of claim 3 in which said material is the hard portion of a plant seed.

5. The well-servicing composition of claim 2 in which said slurry is a suspension of Portland cement in water.

6. The well-servicing composition of claim 5 in which said material is the hard portion of a plant seed.

7. A method of servicing a well comprising circulating in said well a composition comprising a slurry and from about 2 to 60 pounds of an additive per barrel of said slurry, said slurry being of the class consisting of aqueous drilling fluids, non-aqueous drilling fluids and Portland cement slurries, and said additive consisting essentially of granular particles of a water-resistant, oil-resistant material having a compressive strength of at least about 5,000 pounds per square inch, a modulus of elasticity of at least about 10,000 pounds per square inch, a hardness between about 2 and 5 on the Mohs scale, a specific gravity between about 0.8 and 2.0 compared to water, and a melting point of at least about 120° F., said particles having an average Krumbein sphericity of at least about 0.4, and said additive consisting of from about 20 to 90 percent particles passing a number 30 screen and retainable on a number 40 screen, from about 10 to 80 percent particles passing a number 40 screen, and retainable on a number 100 screen, and not more than about 10 percent particles passing a number 100 screen, all percentages being by weight.

8. A method of servicing a well comprising circulating in said well a composition comprising a slurry, and from about 2 to 60 pounds of an additive per barrel of said slurry, said slurry being of the class consisting of aqueous drilling fluids, non-aqueous drilling fluids and Portland cement slurries, and said additive consisting essentially of granular particles of a water-resistant, oil-resistant material having a compressive strength of at least about 5,000 pounds per square inch, a modulus of elasticity of at least about 10,000 pounds per square inch, a hardness between about 2 and 5 on the Mohs scale, a specific gravity between about 0.8 and 2.0 compared to water, and a melting point of at least about 120° F., said particles having an average Krumbein sphericity of at least about 0.4 and an average Krumbein roundness of not more than about 0.6, and said additive consisting of from about 20 to 90 percent particles passing a number 30 screen and retainable on a number 40 screen, from about 10 to 80 percent particles passing a number 40 screen and retainable on a number 100 screen, and not more than about 10 percent particles passing a number 100 screen, all percentages being by weight.

9. The method of claim 8 in which said composition is a drilling fluid.

10. The method of claim 9 in which said material is the hard portion of a plant seed.

11. The method of claim 8 in which said composition is a suspension of Portland cement in water.

12. The method of claim 11 in which said material is the hard portion of a plant seed.

References Cited in the file of this patent

UNITED STATES PATENTS

| | | |
|---|---|---|
| 2,319,182 | Van der Pyl | May 11, 1943 |
| 2,351,434 | Jessen et al. | June 13, 1944 |
| 2,398,347 | Anderson | Apr. 16, 1948 |
| 2,502,191 | Williams | Mar. 28, 1950 |
| 2,561,075 | Sidwell | July 17, 1951 |
| 2,815,079 | Goins et al. | Dec. 3, 1957 |

OTHER REFERENCES

Rogers: Composition and Properties of Oil Well Drilling Fluids, 1st ed., pub. 1948 by Gulf Pub. Co. of Houston, Texas, pages 449 and 450.